United States Patent
Bérubé et al.

(10) Patent No.: US 7,116,107 B2
(45) Date of Patent: Oct. 3, 2006

(54) TRANSMITTER LOOPS IN SERIES FOR ELECTROMAGNETIC GEOPHYSICAL SURVEYS

(75) Inventors: Pierre Bérubé, Val-d'Or (CA); Marc Boivin, Jérémie (CA); Circé Malo-Lalande, Val-d'Or (CA); Pascal Paré, Ste-Foy (CA)

(73) Assignee: Abitibi Geophysics Inc., Val-d'Or (CA)

( * ) Notice: Subject to any disclaimer, the term of this patent is extended or adjusted under 35 U.S.C. 154(b) by 81 days.

(21) Appl. No.: 10/937,306

(22) Filed: Sep. 10, 2004

(65) Prior Publication Data

US 2006/0055410 A1    Mar. 16, 2006

(51) Int. Cl.
*G01V 3/08*    (2006.01)

(52) U.S. Cl. .................................... 324/326; 324/67
(58) Field of Classification Search ........ 324/326–329, 324/332, 336, 238–240, 234, 67; 340/551, 340/941
See application file for complete search history.

(56) References Cited

U.S. PATENT DOCUMENTS 3,757,501 A  *  9/1973 Bennett et al. ............... 460/2
4,161,686 A  *  7/1979 Weber ........................ 324/326
4,595,877 A  *  6/1986 Dulk .......................... 324/239
4,859,947 A     8/1989 Boskamp
4,912,414 A  *  3/1990 Lesky et al. ................ 324/329

FOREIGN PATENT DOCUMENTS

JP        53097718    *    8/1978

* cited by examiner

*Primary Examiner*—Jay M. Patidar
(74) *Attorney, Agent, or Firm*—Ogilvy Renault, LLP

(57) ABSTRACT

The invention relates to a transmitter loop configuration used for ground and downhole electromagnetic geophysical surveys. The loop wire is spread out on the ground surface in such a way as to form several subset loops in series. Each subset loop can be juxtaposed to each other or separated by a fixed distance. The contribution of each subset to the primary electromagnetic field is improved in intensity and vector orientation so as to energize more efficiently buried geological conductors. This design generates a strong sub-horizontal primary field in an in-loop zone of the global loop. Any sub-vertical conductor buried under this in-loop zone will be maximum-coupled and will generate a secondary electromagnetic field detectable by a receiver device. This invention includes the possibility of using a combination a several pairs of loops.

15 Claims, 7 Drawing Sheets

FIG_4

TRANSMITTER LOOPS IN SERIES FOR ELECTROMAGNETIC GEOPHYSICAL SURVEYS

FIELD OF THE INVENTION

The invention relates to a transmitter loop configuration used for ground and downhole electromagnetic geophysical surveys.

BACKGROUND OF THE ART

In electromagnetic prospecting, a coil or a loop carrying a pulsed or alternating current causes induced currents (I in FIG. 1A) to flow in conducting ore bodies, and the time-varying magnetic field (also called secondary magnetic field) associated to these currents is detected by means of a second coil (or receiver loop) placed some distance away from the first one. A mapping of this secondary magnetic field may thus give information on the distribution of conductors in the ground under exploration.

Figure 1A:
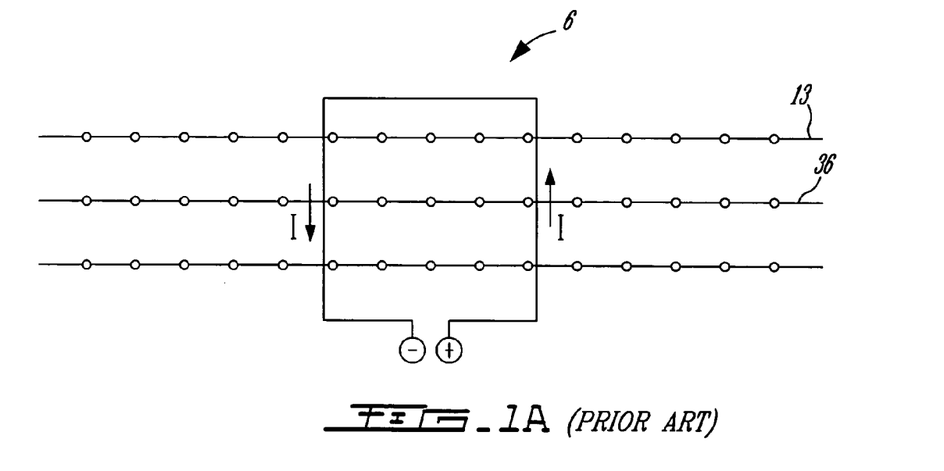
FIG. 1A is a schematic view of a transmitter loop, labeled prior art, with only one loop.

Such time domain electromagnetic surveys can be performed either using a moving transmitter (moving loop surveys) or a fixed transmitter loop (fixed loop surveys). In the case of moving loop surveys, the transmitter loop and receiver loop setup is moved along survey lines for every reading in order to produce a map of buried conductors under the investigated area. In the case of fixed loop surveys, a fixed transmitter single-loop 6, deployed on the ground as illustrated in FIG. 1A, produced a time-varying primary magnetic field and a roving receiver sensor measures, along survey lines 13, the secondary magnetic field produced by the conductors in the ground.

When the survey lines are located outside the transmitter loop, the configuration is called an out-of-loop survey. When the survey lines are located inside the transmitter loop, the configuration is called an in-loop survey. A given survey may naturally combine the out-of-loop and in-loop surveys.

Figure 2A:
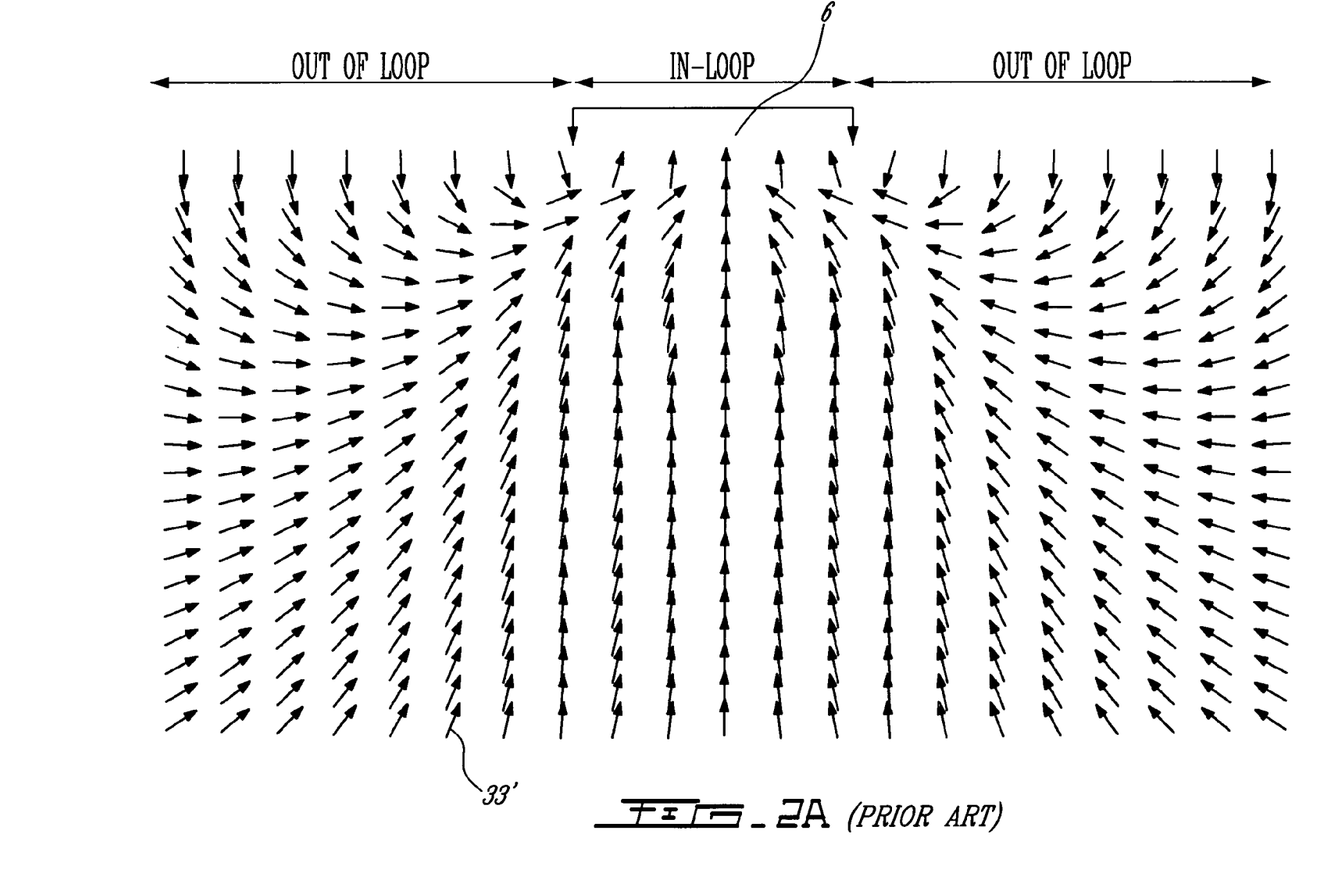
FIG. 2A is a graph, labeled prior art, illustrating the direction of a primary magnetic field produced by the transmitter loop of FIG. 1A.
Figure 2B:
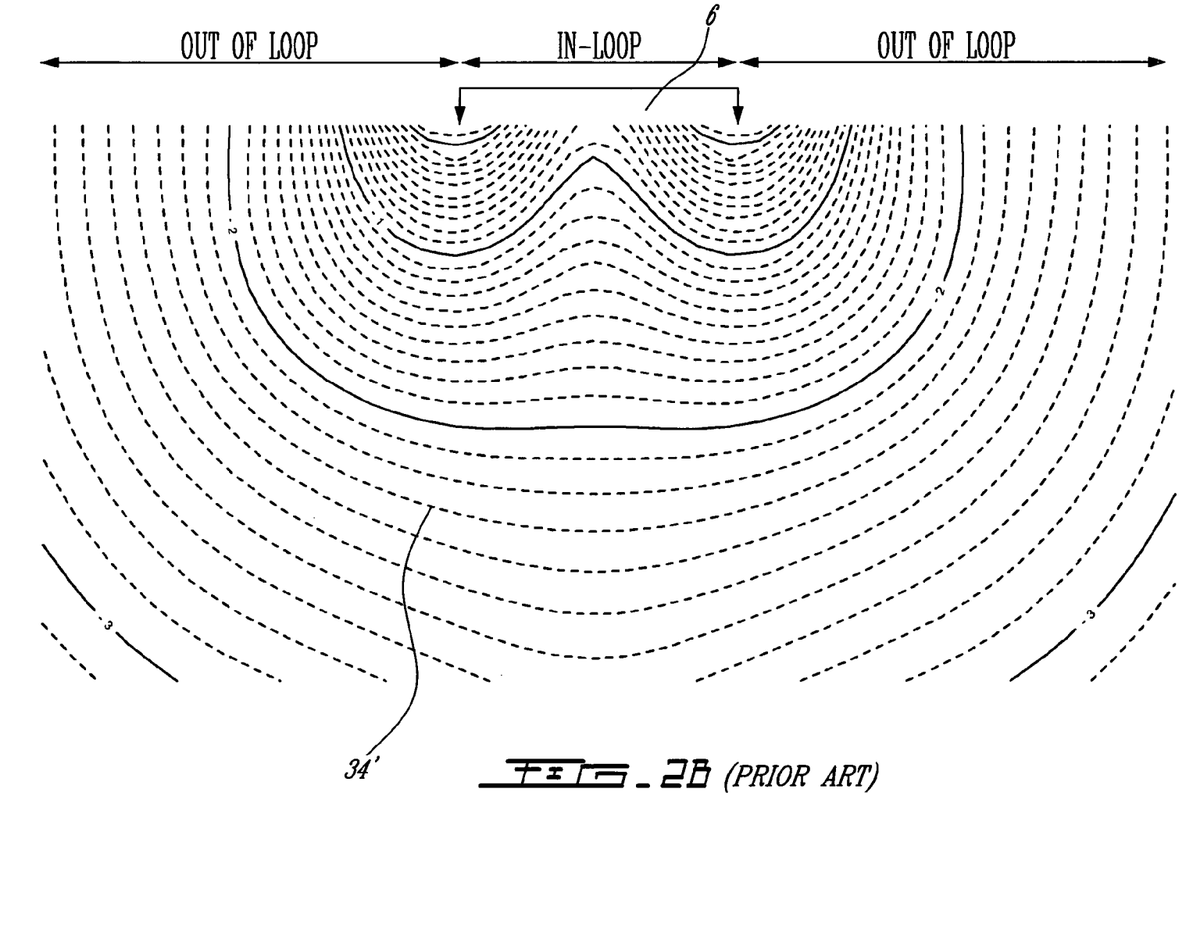
FIG. 2B is a graph, labeled prior art, illustrating the intensity of the primary magnetic field of FIG. 2A.

In the search of steep-dipping geological conductors, the main advantages of the out-of-loop survey are the uniformity and the sub-horizontality of the primary electromagnetic field under the survey area. This is illustrated in FIG. 2A and FIG. 2B where the direction of the magnetic field 33' in the ground under the transmitter loop 6 of FIG. 1A has been drawn (FIG. 2A) as well as its intensity 34' (FIG. 2B). It can be seen from FIG. 2A that the primary electromagnetic field under the out-of-loop area is quite horizontal. This optimizes the coupling between the primary electromagnetic field and any buried steeply-dipping conductor. However, the main disadvantage of the out-of-loop configuration is the exponential decrease of the intensity of this primary electromagnetic field from the loop side, as illustrated in FIG. 2B. The sensitivity and the effectiveness of the configuration decrease with distance from the loop side.

For the same type of geological conductor, the main advantage of the in-loop survey is the strong intensity of the primary electromagnetic field under the loop, as can be noted on FIG. 2B. This intensity permits better sensitivities and greater depths of investigation. The main disadvantage of the in-loop mode is the sub-vertical orientation of the primary electromagnetic field under the loop, as illustrated in FIG. 2A. This orientation of the primary magnetic field causes a poor coupling between the primary electromagnetic field and any sub-vertical conductors.

Figure 1B:
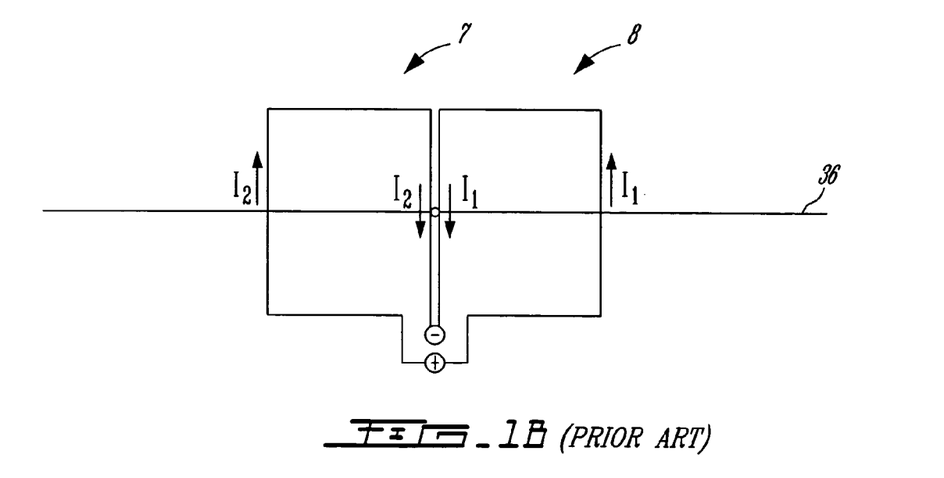
FIG. 1B is a schematic view of a transmitter loop, labeled prior art, with two subset loops connected in parallel.

A dual-loop configuration, with two subset loops 7, 8 connected in parallel, as illustrated in FIG. 1B, has been proposed for mobile loop surveys to create a sub-horizontal primary magnetic field under an in-loop zone. However, the primary magnetic field produced by this loop configuration lacks uniformity. Another drawback of this dual-loop configuration is that since the two subset loops are connected in parallel, the current in each subset loop (currents $I_1$, and $I_2$) may be slightly different and this can create some parasitical effects. Also note that moving the mobile loop is complicated and unproductive.

Thus, there is a need for a transmitter loop configuration that would provide at the same time an intense, substantially uniform and substantially horizontal primary electromagnetic field without the foregoing disadvantages.

SUMMARY

In one of its aspects, the present invention benefits from the advantages of both the in-loop and out-of-loop surveys modes by using a loop configuration comprising one or more pairs of loop of reverse polarity for surface or downhole time domain electromagnetic surveys.

The invention provides a transmitter loop, adapted to be connected to a source of current and used for electromagnetic geophysical surveys, the transmitter loop being configured to form a pair of subset loops in series, wherein the series configuration enables, when the current is provided, the current to be the same in both subset loops. The transmission loop is also configured such that the subset loops are substantially in a same plane and are adjacently placed to be side-by-side, such that one segment of the first subset loop is facing one segment of the second subset loop and such that both segments are substantially parallel to define a loop region where the current, when provided, flows in both segments in the same direction.

Advantageously, the transmitter loop has subset loops of substantially identical and rectangular shapes. Also, the subset loops are side by side in a manner such that their facing segments are distant from each other to create, in a vicinity of the loop region and when the current is provided, a primary magnetic field that is substantially directed along the plane.

The invention also provides a butterfly transmitter loop, adapted to be connected to a source of current and used for electromagnetic geophysical surveys, the butterfly transmitter loop being configured to form four subset loops in series, wherein the series configuration enables, when the current is provided, the current to be the same in the four subset loops. The subset loops are substantially in a same plane and are adjacently placed to be side-by-side to form a butterfly configuration, such that a transversal segment of the first subset loop is facing a transversal segment of the second subset loop, in a manner where both segments are substantially parallel to define a first loop region where the current, when provided, flows in both segments in the same direction. The butterfly transmitter loop is also characterized by having a transversal segment of third subset loop facing a transversal segment of the fourth subset loop, so that they are substantially parallel to define a second loop region where the current, when provided, flows in both segments in the same direction. The butterfly transmitter loop is also characterized by having a longitudinal segment of the second subset loop facing a longitudinal segment of the fourth subset loop, so that they are substantially parallel to define a third loop region where the current, when provided, flows in both segments in the same direction. Finally, the butterfly transmitter loop is also characterized by having a longitudinal segment of the first subset loop facing a longitudinal segment of the third subset loop, so that they are substantially parallel to define a fourth loop region where the current, when provided, flows in both segments in the same direction.

Advantageously, the subset loops of the butterfly transmission loop are side by side in a manner such as their facing segments are distant from each other to create, in a vicinity of the loop regions and when the current is provided, a primary magnetic field that is substantially directed along the plane.

The invention further provides a transmitter loop, adapted to be connected to a source of current and used for electromagnetic geophysical surveys, the transmitter loop being configured to form at least two subset loops in series, wherein the series configuration enables, when the current is provided, the current to be the same in all subset loops. The subset loops are substantially in a same plane and are adjacently placed to be side-by-side, such that at least one segment of each subset loop is facing at least one segment of another subset loop and is substantially parallel to the at least one segment of another subset loop such that the facing segments are defining at least one loop region where the current, when provided, flows in facing segments in the same direction.

Advantageously, all the provided transmission loops can be used as fixed loop transmitters for ground and downhole electromagnetic geophysical surveys.

The invention further provides a system, used in electromagnetic geophysical surveys, for generating, in an in-loop zone, a primary magnetic field substantially parallel to a reference plane. The system comprises a unit for generating a current. It also comprises a transmitter loop, connected to the unit and disposed in a plane substantially parallel to the reference plane. The transmitter loop is being configured to form at least two subset loops in series, the series configuration enabling the current to be the same in all subset loops. The transmission loop is further configured in a manner that the subset loops are adjacently placed to be side-by-side, such that at least one segment of each subset loop is facing at least one segment of another subset loop and is substantially parallel to the at least one segment of another subset loop, such that the facing segments are defining at least one loop region where the current flows in facing segments in the same direction, to thereby generating the substantially parallel primary magnetic field in the in-loop zone, wherein the in-loop zone is in a vicinity of the at least one loop region.

The invention further provides a method of electromagnetic geophysical survey using a transmitter loop. The method comprises configuring, in a vicinity of a region to be surveyed, the transmitter loop in order to form at least two subset loops in series, wherein said subset loops are substantially in the same plane and are adjacently placed to be side-by-side, such that at least one segment of each subset loop is facing at least one segment of another subset loop and is substantially parallel to said at least one segment of another subset loop such that the facing segments are defining at least one loop region where a current can flow in facing segments in the same direction and wherein the series configuration enables the current to be the same in all subset loops. The method also comprises providing a primary magnetic field in the region to be surveyed by having a current circulating in the transmitter loop, wherein the primary magnetic flux comprises a portion, in the vicinity of the loop regions, which is substantially parallel to the plane. The method also comprises measuring along survey lines a secondary magnetic field, wherein the second magnetic field is generated by the region in response to changes in the primary magnetic field.

DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, reference to the accompanying drawings is by way of illustration of an example by which the invention may be practiced. It will be understood that other embodiments may be made without departing from the scope of the invention disclosed.

Figure 3A:
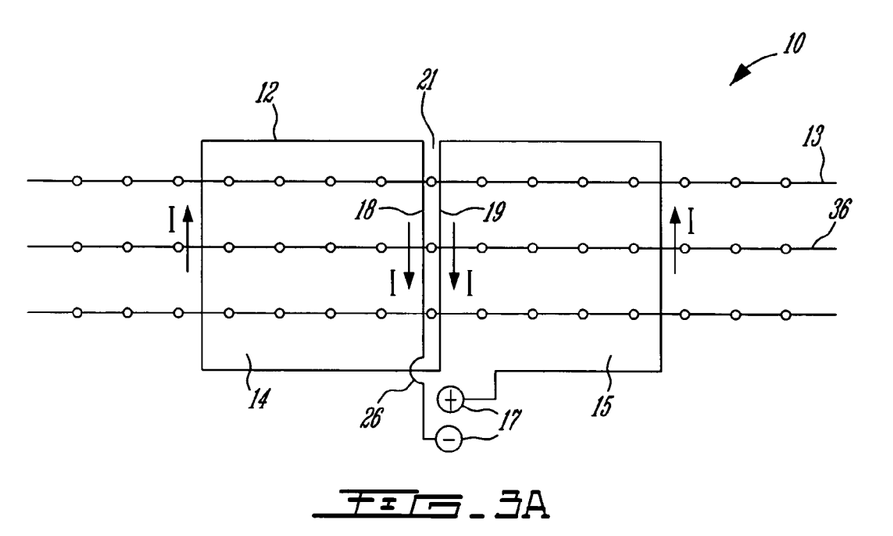
FIG. 3A is a schematic view of a transmitter loop, in accordance with a first embodiment of the present invention.
Figure 5A:
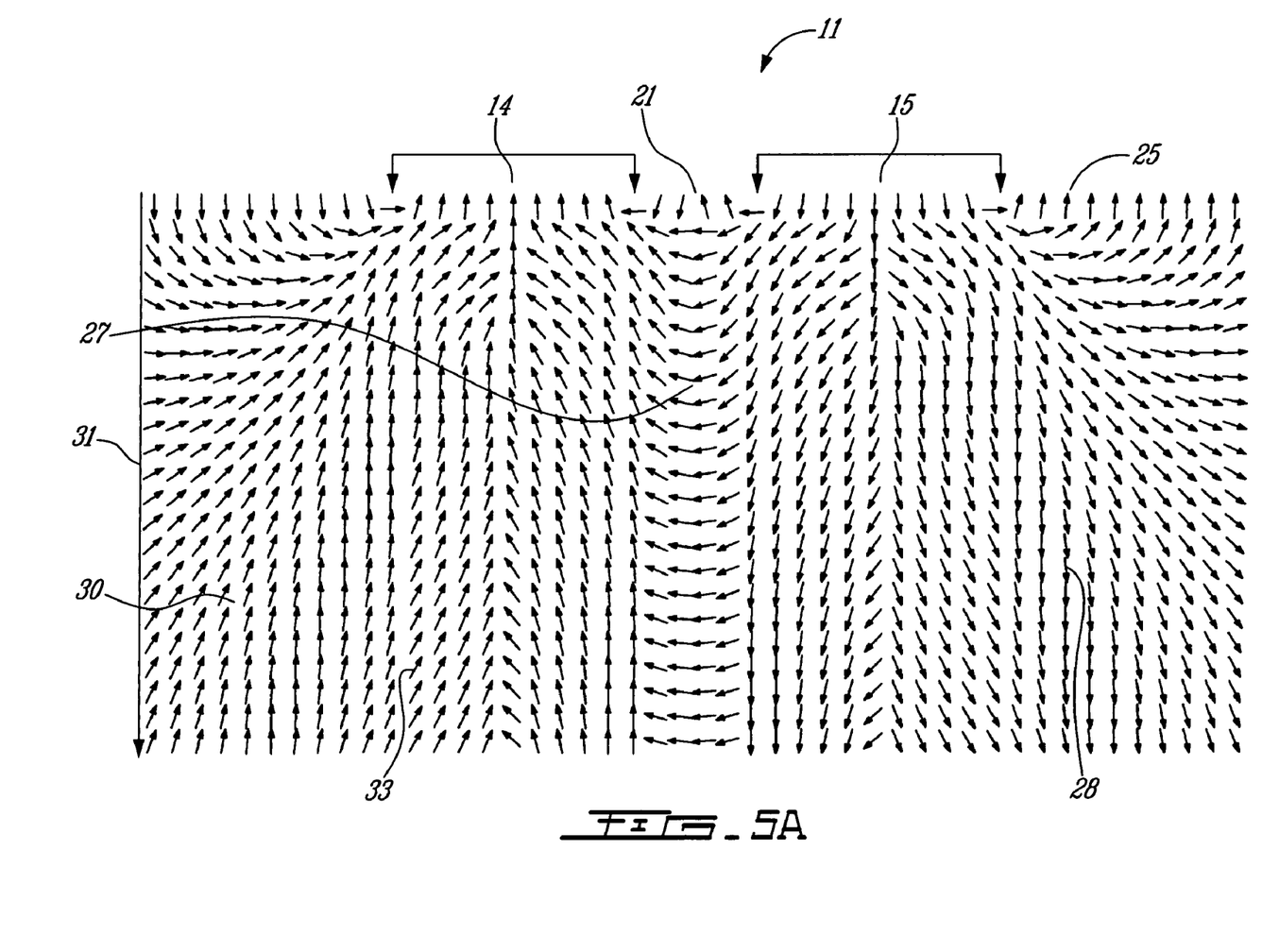
FIG. 5A is a graph illustrating the direction of a primary magnetic field produced by the transmitter loop of FIG. 3B.
Figure 5B:
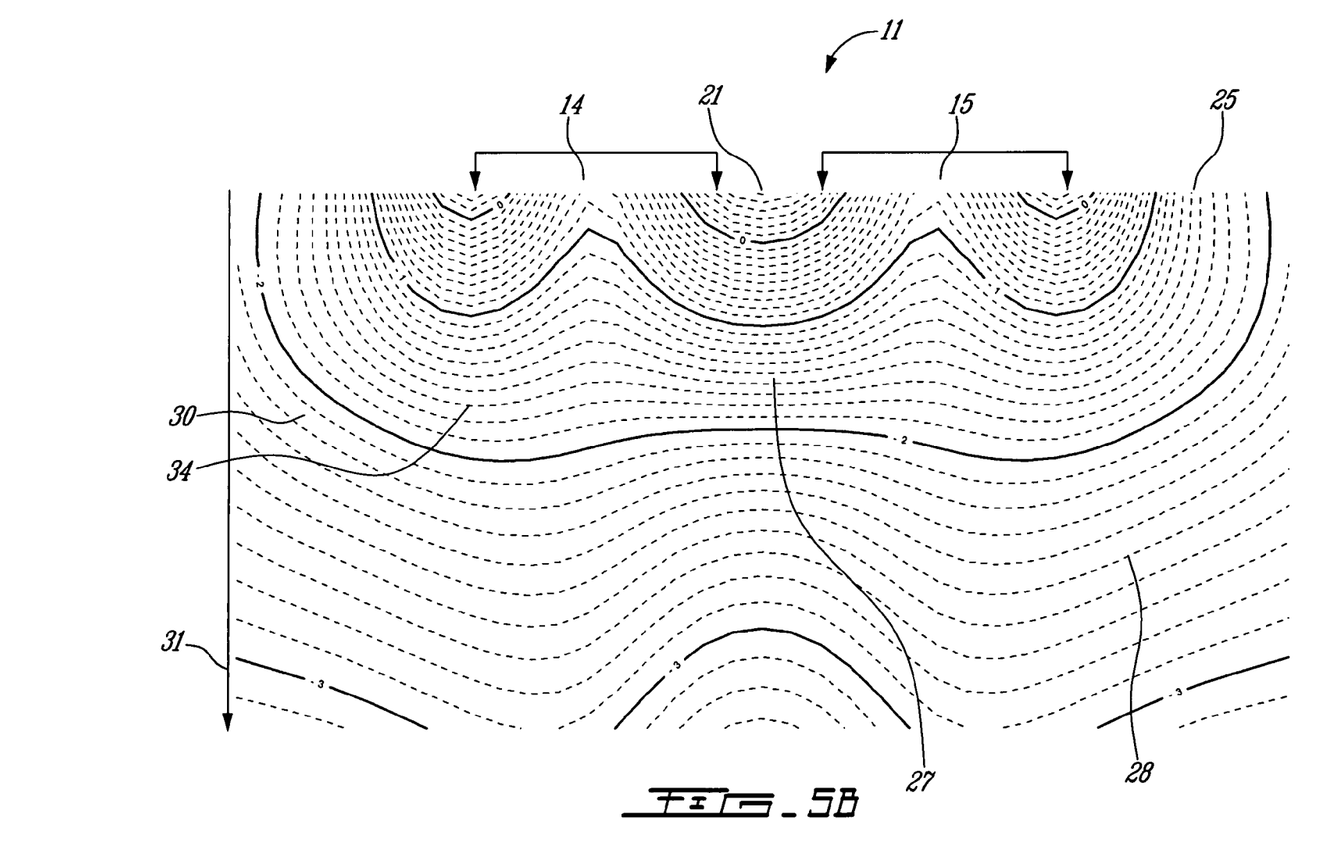
FIG. 5B is a graph illustrating the intensity of the primary magnetic field of FIG. 5A.

In one embodiment of the present invention, the transmitter loop used to perform the electromagnetic geophysical surveys, is a fixed transmitter loop 10 as illustrated in FIG. 3A. This fixed transmitter loop 10 is deployed on the surface of the ground 30, also referred to as the reference plane 25, for geophysical electromagnetic surveys (as shown in FIGS. 5A and 5B). An example of survey lines 13, 36 along which the secondary magnetic field is sampled, is shown on FIG. 3A. The fixed transmitter loop 10 can be made, for example, of a loop wire 12 that can be connected to a current source (not shown) via two connecting terminations 17. The fixed transmitter loop is configured to form a pair of subset loops 14, 15 in series such that when a current flows in the loop 10, the current is the same in both subset loops 14, 15. This characteristic of the present invention allows a more accurate measurement. As illustrated in FIG. 3A, the fixed transmitter loop 10 is configured in two adjacent subset loops, a left subset loop 14 and a right subset loop 15. Subset loops 14 and 15 are placed such as to have one of their segments facing each other: segment 18 of the left subset loop 14 is facing segment 19 of right subset loop 15. Also, segments 18 and 19 are arranged such as to be substantially parallel to each other in order to define a loop region 21 where the current flows in both segments in the same direction.

Figure 3B:
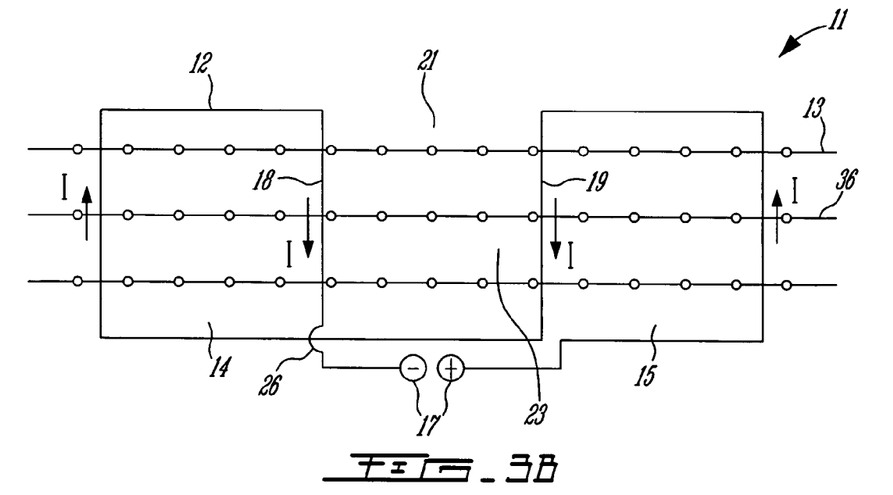
FIG. 3B is a schematic view of a transmitter loop, in accordance with a second embodiment of the present invention.

Now referring to FIG. 3B, a second embodiment of the present invention shows a transmitter loop 11 comprising a pair of adjacent but spaced subset loops (14, 15), that can be used as a fixed transmitter loop. In certain circumstances, the transmitter loop may be a moving transmitter loop. Transmitter loop 11 that is also configured to form a pair of adjacent subset loops in series such that when a current flows in the loop 11, the current is the same in both subset loops 14, 15. As mentioned above this characteristic of the present invention allows better measurement (e.g., allows deeper investigation). The two adjacent subset loops, a left subset loop 14 and a right subset loop 15, are placed such as to have one of their segments facing each other: segment 18 of the left subset loop 14 is facing segment 19 of right subset loop 15. Also, segments 18 and 19 are arranged such as to be substantially parallel to each other in order to define a loop region 21 where the current flows in both segments in the same direction. One characteristic of this transmitter loop 11 is that left 14 and right 15 subset loops are adjacently placed to provide a space 23 between segments 18 and 19. As discussed below, this characteristic provides a primary magnetic field with particular properties.

FIG. 5A illustrates the direction 33 of the primary magnetic field as a function of ground depth 31 produced by the transmitter loop 11 of FIG. 3B whereas FIG. 5B illustrates the intensity contours 34 of the same primary magnetic field as a function of ground depth 31. On both figures, the transmitter loop 11 is deployed on the surface of the ground, also referred to as the reference plane 25, and the ground section that is illustrated on these figures corresponds to a cross-section taken along a central survey line 36.

As can be seen on FIG. %A, loop transmitter 11 provides an in-loop zone 27 beneath space 23 (from FIG. 3B), where the direction of primary magnetic field is substantially horizontal. This in-loop zone 27 is actually located just under the loop region 21 where the current circulates in segments 18 and 19 in the same direction. This in-loop zone 27 does not only provide a substantially horizontal primary magnetic field, it also provides for an intense and uniform primary magnetic field, as it can be seen on FIG. 5B, where the magnetic equipotential lines are shown.

It can also be noted in FIGS. 5A and 5B that transmitter loop 11 can also provide for an intense and substantially vertical primary magnetic field in an out-of-loop zone 28 for out-of-loop geophysical surveys.

Thus, this transmitter loop 11, can be used for in-loop surveys to detect steeply-dipping conductors, thanks to its intense, uniform and sub-horizontal primary magnetic field, and can also be used to detect deeply buried horizontal conductors by making use of the intense vertical primary magnetic field created in the out-of-loop survey region. Furthermore, this transmitter loop 11, can be used as a fixed transmitter. In certain circumstances transmitter loop 11 can be a mobile transmitter.

Advantageously, the subset loops 14 and 15 have similar rectangular forms although the present invention it not restricted to perfectly equal rectangular subset loops.

As will be noticed form FIGS. 3A and 3B, in order to provide the loop region 21 where the current circulates in segment 18 and 19 in the same direction, it is necessary, when transmission loops 10 and 11 are configured, to have the loop wire 12 crossing itself somewhere-in its path (e.g., at 26). This crossing 26 can be made at any suitable location along said path.

Figure 4:
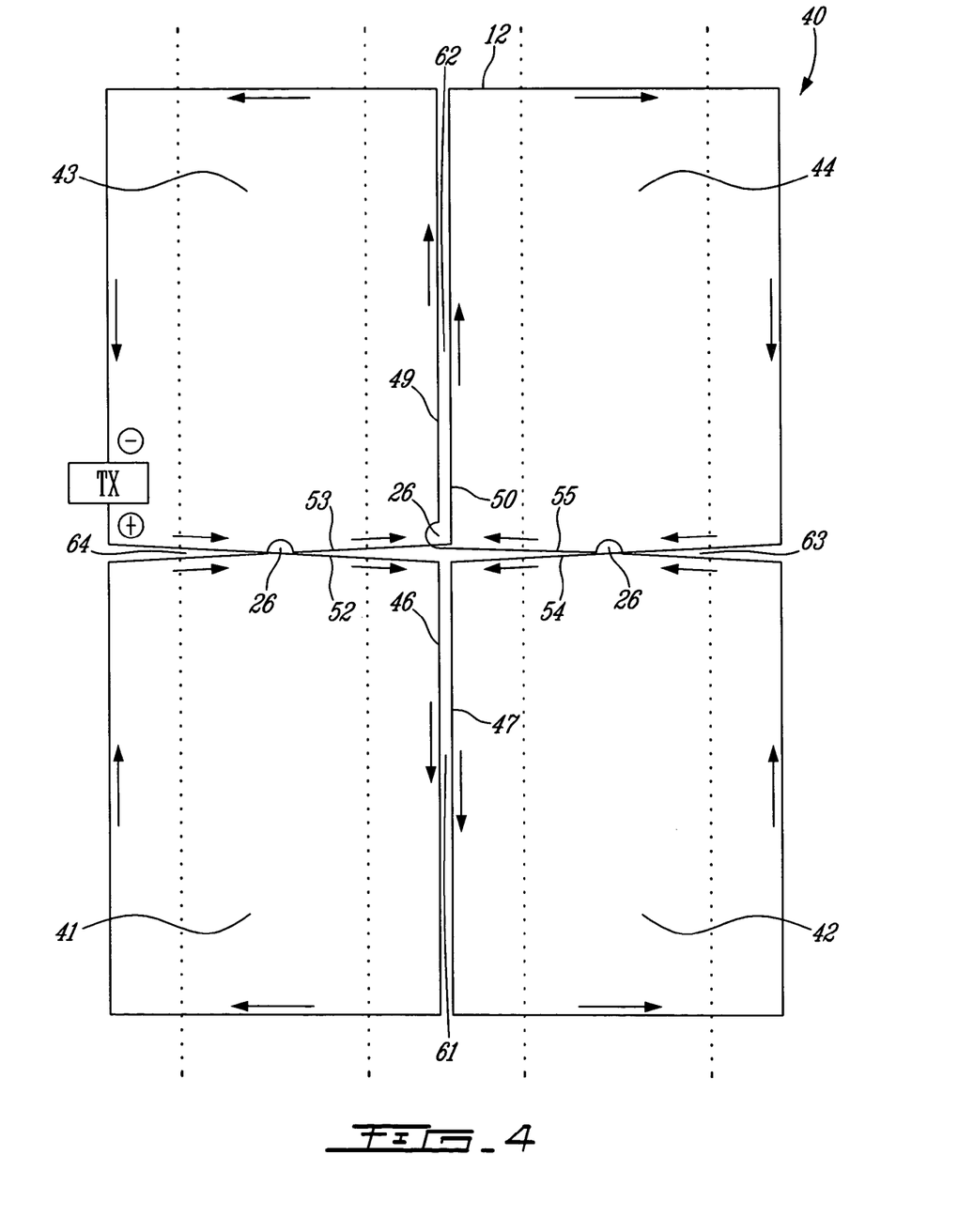
FIG. 4 is a schematic view of a transmitter loop, in accordance with a third embodiment of the present invention.

Now referring to FIG. 4, another embodiment of the present invention shows a butterfly transmitter loop 40, comprising four adjacent subset loops (41, 42, 43, and 44) that can be used as either a fixed or a moving transmitter loop.

This butterfly transmission loop 40 is characterized by the following description. As was the case for the transmission loops 10 and 11, the butterfly transmission loop 40 is configured in order to provide loop regions (61, 62, 63, and 64) where the current circulates in parallel segments in the same direction. Also, the butterfly transmission loop 40 is configured such that when a current is provided in the loop 40, the current is the same in the four subset loops. Thus the four subset loops (41, 42, 43, and 44) are in series. As illustrated in FIG. 4, each subset loop comprises one transversal segment (46, 47, 49, and 50) and one longitudinal segment (52, 53, 54, and 55) disposed in a manner such that all transversal segments (46, 47, 49, and 50) are substantially parallel to each other and all longitudinal segments (52, 53, 54, and 55) are substantially parallel to each other. Also, it may be noted that the transversal segment 46 of the first subset loop 41 is facing the transversal segment 47 of the second subset loop 42 so to define the first loop region 61 where the current flows in both segments 46,47 in the same direction. Also, the transversal segment 49 of the third subset loop 43 is facing the transversal segment 50 of the fourth subset loop 44 so to define the second loop region 62 where the current flows in both segments 49,50 in the same direction. Then, the longitudinal segment 54 of the second subset loop 42 is facing the longitudinal segment 55 of the fourth subset loop 44 so to define the third loop region 63 where the current flows in both segments 54, 55 in the same direction. Finally, the longitudinal segment 52 of the first subset loop 41 is facing the longitudinal segment 53 of the third subset loop 43 so to define the fourth loop region 64 where the current flows in both segments 52, 53 in the same direction.

As was the case for transmission loops 10 and 11, the subset loops 41, 42, 43 and 44 have advantageously similar rectangular forms although the present invention is not restricted to perfectly equal rectangular subset loops. Also, it is needed, when transmission loops 40 is configured, to have the loop wire 12 crossing itself somewhere in its path (e.g., at 26). This crossing 26 can be made at any suitable location along said path, and the crossing 26 emplacements shown in FIG. 4 are only given as an example.

Similarly to transmission loops 10 and 11, the butterfly transmission loop 40 provides for in-loop zones 27, located under transmission loop 40 in the vicinity of the four loop regions (61, 62, 63, and 64), where the primary magnetic field is substantially horizontal, uniform and intense. At the same time, the butterfly transmission loop 40 provides a substantially vertical primary field for out-of-loop geophysical surveys.

As will be obvious for someone skilled in the art, other transmission loop configuration, providing the above-described primary magnetic field characteristics, can be envisaged and those configurations are encompassed in the present invention. Particularly any loop configuration that forms several subset loop in series (such that the current is the same in all subset loops) and that are adjacently placed as described above (side-by-side, in the same plane, such as to create a substantially horizontal primary magnetic field in an in-loop region of the transmission loop), are encompassed in the present invention.

In another embodiment, the present invention provides a system used in electromagnetic geophysical surveys, for providing, in an in-loop zone 27, a primary magnetic field substantially parallel to a reference plane 25. The system comprises a unit for generating a current, a transmitter loop (10 or 11 or 40) having the characteristics described herein, connected to the unit and disposed in a plane substantially parallel to the reference plane 25, whereby when the current flows in the transmitter loop, the substantially parallel primary magnetic field is provided in the in-loop zone 27, which is in a vicinity of the loop region 21 of the transmission loop (10 or 11 or 40).

In another embodiment, the present invention provides a method for electromagnetic geophysical surveys that consists in configuring, in a vicinity of a region to be surveyed, a transmitter loop (10 or 11 or 40) having the characteristics described herein, then to create a primary magnetic field in the region by having a current circulating in the loop, and to measure along survey lines 13, 36 a secondary magnetic filed generated by buried conductors in the region in response to changes in the primary magnetic field.

Although the present invention has been described hereinabove by way of specific embodiments thereof, it can be modified, without departing from the spirit and nature of the subject invention as defined herein. The scope of the invention is therefore intended to be limited solely by the scope of the appended claims.

We claim:

1. A transmitter loop, adapted to be connected to a source of current and used for electromagnetic geophysical surveys,
   the transmitter loop being configured to form a pair of subset loops in series, wherein the series configuration enables, when said current is provided, the current to be the same in both subset loops, and
   wherein said subset loops are substantially in a same plane and are adjacently placed to be side-by-side, such that one segment of the first subset loop is facing one segment of the second subset loop and such that both segments are substantially parallel to define a loop region where said current, when provided, flows in both segments in the same direction.

2. The transmitter loop of claim 1, wherein said subset loops have substantially identical shapes.

3. The transmitter loop of claim 2, wherein each of said subset loops has a substantially rectangular shape.

4. The loop as claimed in claim 1, wherein said subset loops are side by side in a manner such as said facing segments are very close to each other.

5. The loop as claimed in claim 4, wherein said loop comprises a fixed transmitter loop.

6. The loop as claimed in claim 1, wherein said subset loops are side by side in a manner such that said facing segments are distant from each other to create, in a vicinity of said loop region and when said current is provided, a primary magnetic field that is substantially directed along said plane.

7. The transmitter loop of claim 6, wherein said subset loops have substantially identical shapes.

8. The transmitter loop of claim 7, wherein each of said subset loops has a substantially rectangular shape.

9. A butterfly transmitter loop, adapted to be connected to a source of current and used for electromagnetic geophysical surveys,
   the butterfly transmitter loop being configured to form four subset loops in series, wherein the series configuration enables, when said current is provided, the current to be the same in the four subset loops, and
   wherein said subset loops are substantially in a same plane and are adjacently placed to be side-by-side to form a butterfly configuration, such that
   a transversal segment of the first subset loop is facing a transversal segment of the second subset loop, in a manner where both segments are substantially parallel to define a first loop region where said current, when provided, flows in both segments in the same direction, and
   a transversal segment of third subset loop is facing a transversal segment of the fourth subset loop, so that they are substantially parallel to define a second loop region where said current, when provided, flows in both segments in the same direction, and
   a longitudinal segment of the second subset loop is facing a longitudinal segment of the fourth subset loop, so that they are substantially parallel to define a third loop region where said current, when provided, flows in both segments in the same direction, and
   a longitudinal segment of the first subset loop is facing a longitudinal segment of the third subset loop, so that they are substantially parallel to define a fourth loop region where said current, when provided, flows in both segments in the same direction.

10. The loop as claimed in claim 9, wherein said subset loops are side by side in a manner such as said facing segments are distant from each other to create, in a vicinity of said loop regions and when said current is provided, a primary magnetic field that is substantially directed along said plane.

11. The transmitter loop of claim 10, wherein said subset loops have substantially identical shapes.

12. The transmitter loop of claim 11, wherein each of said subset loops has a substantially rectangular shape.

13. A transmitter loop, adapted to be connected to a source of current and used for electromagnetic geophysical surveys,
    the transmitter loop being configured to form at least two subset loops in series, wherein the series configuration enables, when said current is provided, the current to be the same in all subset loops, and
    wherein said subset loops are substantially in a same plane and are adjacently placed to be side-by-side, such that at least one segment of each subset loop is facing at least one segment of another subset loop and is substantially parallel to said at least one segment of another subset loop such that said facing segments are defining at least one loop region where said current, when provided, flows in facing segments in the same direction.

14. A system for providing, in an in-loop zone, a primary magnetic field substantially parallel to a reference plane, wherein said system is used in electromagnetic geophysical surveys, the system comprising:
    a unit for generating a current;
    a transmitter loop, connected to the unit and disposed in a plane substantially parallel to the reference plane, the transmitter loop being configured to form at least two subset loops in series, wherein said subset loops are adjacently placed to be side-by-side, such that at least one segment of each subset loop is facing at least one segment of another subset loop and is substantially parallel to said at least one segment of another subset loop, such that said facing segments are defining at least one loop region where said current flows in facing segments in the same direction, and wherein the series configuration enables said current to be the same in all subset loops,
    whereby when said current flows in the transmitter loop, said substantially parallel primary magnetic field is provided in said in-loop zone, wherein said in-loop zone is in a vicinity of said at least one loop region.

15. A method of electromagnetic geophysical survey using a transmitter loop, the method comprising:

configuring, in a vicinity of a region to be surveyed, said transmitter loop in order to form at least two subset loops in series, wherein said subset loops are substantially in the same plane and are adjacently placed to be side-by-side, such that at least one segment of each subset loop is facing at least one segment of another subset loop and is substantially parallel to said at least one segment of another subset loop such that said facing segments are defining at least one loop region where a current can flow in facing segments in the same direction, and wherein the series configuration enables said current to be the same in all subset loops, providing a primary magnetic field in said region to be surveyed by having a current circulating in said transmitter loop, wherein said primary magnetic flux comprises a portion, in the vicinity of said loop regions, which is substantially parallel to said plane; and measuring along survey lines a secondary magnetic field, wherein said second magnetic field is generated by said region in response to changes in the primary magnetic field.

* * * * *